US 9,043,020 B2

(12) United States Patent
Kodama

(10) Patent No.: US 9,043,020 B2
(45) Date of Patent: May 26, 2015

(54) METHOD FOR DETERMINING SUBSTRATE TRANSPORTATION PATH, SUBSTRATE TRANSPORTING APPARATUS, SUBSTRATE PROCESSING APPARATUS AND COMPUTER-READABLE STORAGE MEDIUM STORING A PROGRAM FOR PERFORMING THE METHOD

(71) Applicant: Tokyo Electron Limited, Tokyo (JP)

(72) Inventor: Toshiaki Kodama, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 14/182,480

(22) Filed: Feb. 18, 2014

(65) Prior Publication Data
US 2014/0249674 A1 Sep. 4, 2014

(30) Foreign Application Priority Data

Mar. 4, 2013 (JP) ................................. 2013-041699

(51) Int. Cl.
| G06F 19/00 | (2011.01) |
| B25J 9/16 | (2006.01) |
| B25J 18/00 | (2006.01) |
| B65H 1/00 | (2006.01) |
| H01L 21/30 | (2006.01) |

(52) U.S. Cl.
CPC ..... *B25J 9/1664* (2013.01); *G05B 2219/45031* (2013.01)

(58) Field of Classification Search
USPC ...................... 700/246, 245; 414/217, 222.13; 74/490.03, 490.04; 438/758; 118/620
See application file for complete search history.

(56) References Cited

U.S. PATENT DOCUMENTS

| 6,037,733 | A  * | 3/2000 | Genov et al. ............. 318/568.11 |
| 2002/0089655 | A1* | 7/2002 | Kida et al. ...................... 355/72 |
| 2004/0249509 | A1* | 12/2004 | Rogers et al. ................. 700/245 |
| 2005/0036877 | A1* | 2/2005 | Ogawa et al. .............. 414/744.2 |
| 2006/0045668 | A1* | 3/2006 | Grabowski .................... 414/217 |
| 2006/0216137 | A1* | 9/2006 | Sakata et al. ............. 414/222.13 |
| 2007/0009345 | A1* | 1/2007 | Hall et al. ................ 414/222.01 |
| 2010/0329827 | A1* | 12/2010 | Hoey et al. .................... 414/217 |
| 2011/0263133 | A1* | 10/2011 | Hara et al. .................... 438/758 |
| 2014/0105716 | A1* | 4/2014 | Lee et al. .................. 414/749.1 |

FOREIGN PATENT DOCUMENTS

JP 04-123204 A 4/1992

* cited by examiner

*Primary Examiner* — Ronnie Mancho
(74) *Attorney, Agent, or Firm* — Abelman, Frayne & Schwab

(57) ABSTRACT

A substrate transportation path is determined by first determining a trajectory of a first straight line passing through a start point, calculating a trajectory of a circular arc in contact with the first straight line, calculating a trajectory of a second straight line in contact with the circular arc and passing through the end point, then, if the position of the end point is changed, re-calculating the second straight line as a straight line passing through the changed end point and in contact with the circular arc, and allowing the center of the substrate holding unit to move on the first straight line, and then, move on the circular arc from a first contact point, followed by moving on the second straight line from a second contact point so as to reach the end point.

9 Claims, 3 Drawing Sheets

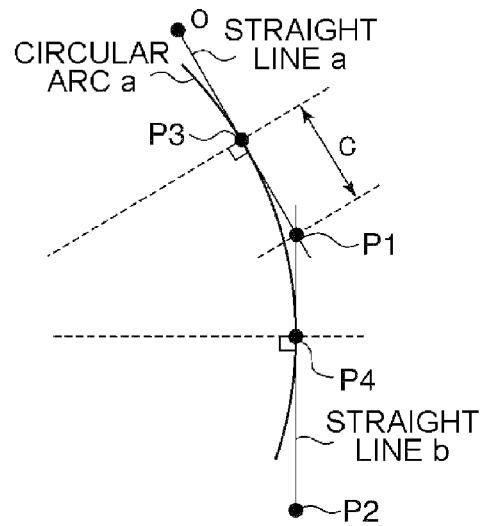
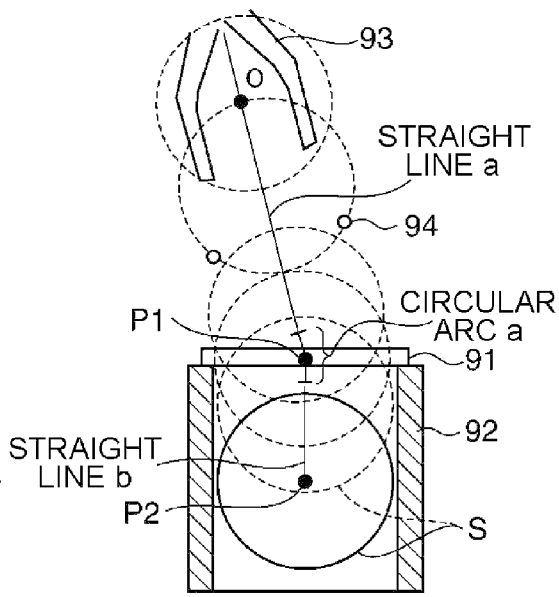
FIG.3A
FIG.3B
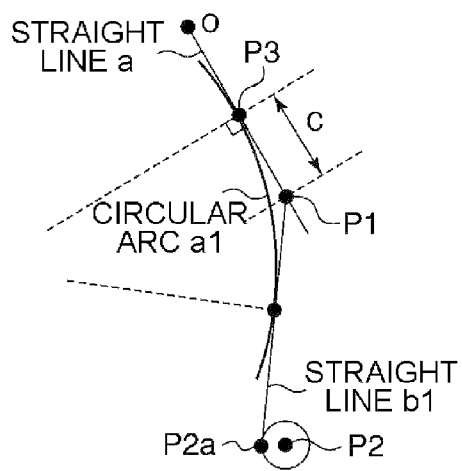
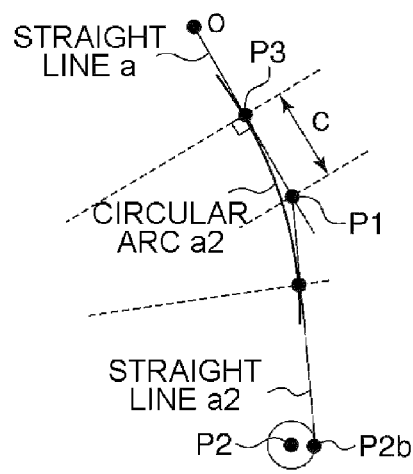
FIG.3C
FIG.3D

METHOD FOR DETERMINING SUBSTRATE TRANSPORTATION PATH, SUBSTRATE TRANSPORTING APPARATUS, SUBSTRATE PROCESSING APPARATUS AND COMPUTER-READABLE STORAGE MEDIUM STORING A PROGRAM FOR PERFORMING THE METHOD

CROSS-REFERENCE TO RELATED APPLICATIONS

This application is based on and claims priority from Japanese Patent Application No. 2013-041699, filed on Mar. 4, 2013 with the Japan Patent Office, the disclosure of which is incorporated herein in its entirety by reference.

TECHNICAL FIELD

The present disclosure relates to a method for determining a substrate transportation path in a substrate processing apparatus that performs a predetermined processing on a substrate such as a semiconductor wafer, a substrate transporting apparatus, a substrate processing apparatus, and a computer-readable storage medium storing a program for performing the method.

BACKGROUND

In a plasma processing apparatus which performs a processing such as a plasma processing on a semiconductor wafer, a substrate accommodated in a container is transported by a transport robot to a plasma processing chamber maintained in a vacuum atmosphere. Generally, the plasma processing apparatus includes a plurality of plasma chambers and one transport robot is provided to access each of the plasma chambers.

Here, in order to save the space in arranging a plurality of plasma chambers, enable the access to each of the plasma chambers by one transport robot, and shorten the transportation distance or transportation time of the semiconductor wafer for the purpose of enhancing the throughput, it is required to change the travel direction during the transportation of the semiconductor wafer. At that time, it is required to control the operation of the transport robot such that the semiconductor wafer moves along a smoothly curved trajectory.

As a method for calculating the transportation path of a substrate such as a semiconductor wafer, a so-called circular interpolation method is utilized. For example, as a method of performing a circular interpolation between a start point and an end point with setting a distance from the start point to the center point as a radius, in a case of calculating a difference between a distance from the end point to the center and the radius, and performing a circular interpolation from the start point to the end point to obtain points on a circular arc, there is suggested a method of interpolating the calculated differences to correct the radii at each interpolation point, and obtaining coordinates of each interpolation points based on the corrected radii. See, e.g., Japanese Patent Laid-Open No. H4-123204.

In addition, there has been known a circular interpolation method of calculating a circular arc which contacts at a certain distance (pass strength) from an intersection point of two straight lines indicating a travel direction. By this circular interpolation method, a method for determining a transportation path transporting a substrate is schematically illustrated in FIGS. 3A to 3D.

FIG. 3A is a schematic view illustrating a substrate transportation path determining method in the related art. A transportation initiating point of a substrate S is set as a start point O, a transportation terminating point of the substrate S is set as an end point P2, an intersection point of straight lines "a" and "b" indicating two travel directions is set as a virtual via-point P1, and these points O, P2, P1 are predetermined. Further, the expression "virtual via-point" is used herein because the substrate S does not pass along the virtual via-point P1, but actually passes along a calculated circular arc "a", as described below.

By calculating the circular arc "a" in contact with the straight line "a" at a distance C from the virtual via-point P1 and in contact with the straight line "b", a transportation path is determined, which travels from the start point O, passes through a position P3 (a contact point of the straight line a and the circular arc a), the circular arc "a" and a position P4 (a contact point of the straight line "b" and the circular arc "a"), and arrives at a position P2.

FIG. 3B illustrates an example in which the substrate transportation path determining method of FIG. 3A is applied to a substrate transportation path determining method in a case where a transport robot carries a substrate into a disposing chamber. A fork 93 installed at the tip of an arm (not illustrated) of the transport robot holds the substrate S, and carries the held substrate S into a disposing chamber 92. Here, it is assumed that the center of the substrate S is consistent with the center of the fork 93, and a gate valve 91 is installed at a substrate carrying-in/out port to open/close the substrate carrying-in/out port.

The straight line "a", the straight line "b", the circular arc "a", the virtual via-point P1 and the position P2 as illustrated in FIG. 3B correspond to those of FIG. 3A, respectively. The center of the gate valve 91 is set as the virtual via-point P1, and the center of the disposing chamber 92 is set as the position P2. The straight line "b" passing through the virtual via-point P1 and the position P2 represents a transportation direction carrying the substrate S straightly with respect to the disposing chamber 92, and the straight line a represents a transportation direction of the substrate S determined depending on the disposal position of the transport robot and the disposing chamber 92.

By controlling the operation of the transport robot such that the center of the fork 93 passes through the straight line "a", the circular arc "a" and the straight line "b", the substrate S may be transported smoothly in a short path. Further, in a case where the substrate S is transported by passing through the virtual via-point P1 along the straight line "a" and the straight line b, there is a concern that the transportation direction may be suddenly changed at the virtual via-point P1, and thus, a positional deviation may be caused by an inertial force on the substrate S held in the fork 93. However, since the substrate S is transported so as to pass through the circular arc "a" without passing through the virtual via-point P1, the positional deviation of the substrate S with respect to the fork 93 may be suppressed.

SUMMARY

The present disclosure provides a method for determining a substrate transportation path when moving a substrate holding unit of a substrate transportation robot from a predetermined start point to an end point in order to transport a substrate held in the substrate holding unit. The method of the present disclosure includes determining a trajectory of a first straight line passing through the start point; calculating a trajectory of a circular arc in contact with the first straight line; calculating a trajectory of a second straight line in contact with the circular arc and passing through the end point; then, if the position of the end point is changed, re-calculating the second straight line as a straight line passing through the changed end point without changing a radius of the circular arc and in contact with the circular arc; and allowing the center of the substrate holding unit to move on the first straight line, and then, move on the circular arc from a contact point between the first straight line and the circular arc, followed by moving on the second straight line from a contact point between the circular arc and the second straight line so as to reach the end point.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 3A to 3D are views schematically illustrating an example of transporting a substrate according to a circular interpolation method in the related art.

DETAILED DESCRIPTION

Figure 1:
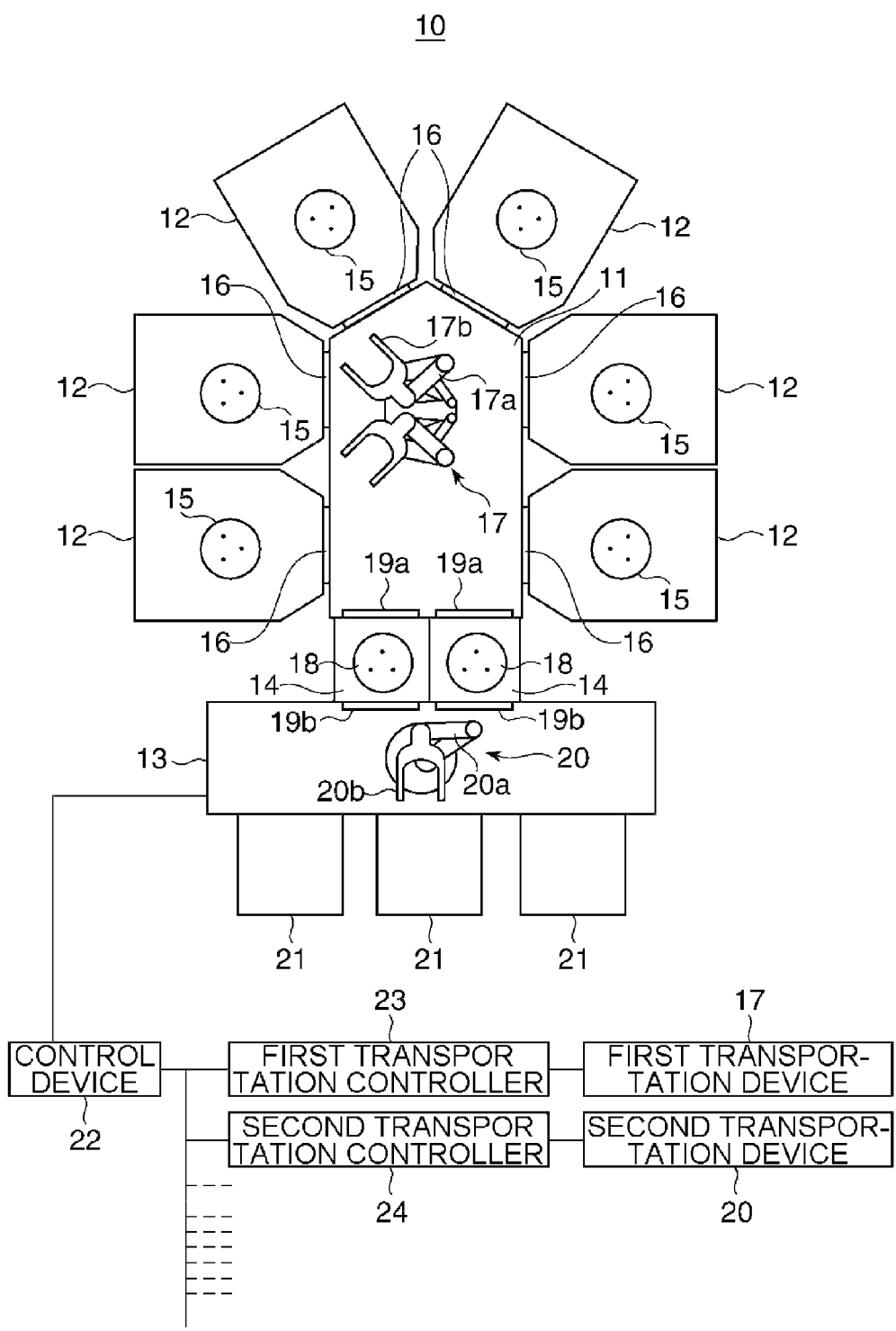
FIG. 1 is a schematic plan view illustrating a configuration of a substrate processing system according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The center of the substrate S held in the fork 93 is not always consistent with the center of the fork 93. Accordingly, as illustrated in FIG. 3B, in order to detect a positional deviation of the substrate S and change the entrance path to the disposing chamber 92, a position detection sensor 94 configured to detect the positional deviation of the substrate S is arranged in the vicinity of the gate valve 91. In a case where the positional deviation is caused in the substrate S held in the fork 93, the transportation path of the fork 93 is changed in order to match the center of the substrate S with the center of the disposing chamber 92, based on a detection signal of the position detection sensor 94.

FIGS. 3C and 3D are views schematically illustrating a change direction of the transportation path in a case where a positional deviation is caused in the substrate S. In order to match the center of the substrate S with the end point P2, the center of the fork 93 is allowed to arrive at a position P2a in FIG. 3C, and the center of the fork 93 is allowed to arrive at a position P2b in FIG. 3D. Since the straight line "a" and the virtual via-point P1 are predetermined, in the case of FIG. 3C, in order to allow the center of the fork 93 to arrive at the position P2a, it is required to calculate a straight line "b1" passing through the via-point P1 and the position P2a, and furthermore, re-calculate a circular arc "a1" in contact with the straight line "a" at the position P3 and in contact with the straight line "b1". Similarly, in the case of FIG. 3D, it is required to calculate a straight line "b2" passing through the via-point P1 and the position P2b, and furthermore, re-calculate a circular arc "a2" in contact with the straight line "a" at the position P3 and in contact with the straight line "b2".

As such, if the slope of the straight line, which is a direction of transportation path, is changed, and the trajectory of the circular arc to be calculated is changed, calculation load for controlling the operation of the transport robot may be increased. Further, the transport robot establishes a limit on a force such as an inertial force or a centrifugal force applied to the substrate S such that the position of the substrate S held in the fork 93 is not deviated during the substrate transportation. Accordingly, if the radius of the re-calculated circular arc "a1" (or "a2") is changed from the radius of the circular arc "a", the force applied to the substrate S during the substrate transportation is changed in turn. As a result, in order to suppress the positional deviation of the substrate S, it is required to manage the force applied to the substrate S, for example, to change the substrate transportation speed. That is, in order to manage the force applied to the substrate S during the substrate transportation, the control of the substrate transportation becomes complicated, and thus, the calculation load is further increased.

Further, as the substrate becomes larger, it is necessary to reduce a clearance between the substrate carrying-in/out port of the disposing chamber 92 and the substrate S in order to minimize an increase in the area of the disposing chamber 92. Here, since the travel direction of the substrate S is changed considerably in the vicinity of the virtual via-point P1, that is, in the vicinity of the substrate carrying-in/out of the disposing chamber 92, the substrate S is at an increased risk to interfere (e.g., collide and contact) with the substrate carrying in/out port of the disposing chamber 92.

An object of the present disclosure is to provide a method for determining a substrate transportation path which can reduce a load for re-calculating the substrate transportation path when the substrate transportation path needs to be changed, facilitate a management of a force such as an inertial force or a centrifugal force applied to the substrate during the substrate transportation, and suppress an interference of the substrate with a substrate carrying-in/out port, a substrate transporting apparatus, a substrate processing apparatus, and a computer-readable storage medium storing a program for performing the method.

In order to achieve the above-mentioned object, the present disclosure provides a method for determining a substrate transportation path when moving a substrate holding unit of a substrate transportation robot from a predetermined start point to an end point in order to transport a substrate held in the substrate holding unit. The method of the present disclosure includes determining a trajectory of a first straight line passing through the start point; calculating a trajectory of a circular arc in contact with the first straight line; calculating a trajectory of a second straight line in contact with the circular arc and passing through the end point; then, if the position of the end point is changed, re-calculating the second straight line as a straight line passing through the changed end point without changing a radius of the circular arc and in contact with the circular arc; and allowing the center of the substrate holding unit to move on the first straight line, and then, move on the circular arc from a contact point between the first straight line and the circular arc, followed by moving on the second straight line from a contact point between the circular arc and the second straight line so as to reach the end point.

In the above-mentioned method, the substrate may be a disc-type semiconductor wafer having a diameter of about 450 mm.

In order to achieve the above-mentioned object, the present disclosure provides a substrate transporting apparatus including a substrate holding unit configured to hold a substrate; a control unit configured to determine a substrate transportation path when moving the substrate holding unit from a predetermined start point to an end point in order to transport a substrate held in the substrate holding unit; and a driving unit configured to drive the substrate holding unit along the substrate transportation path determined by the control unit. The control unit calculates a trajectory of a first straight line passing through the start point of the substrate transportation path, a trajectory of a circular arc in contact with the first straight line, and a trajectory of a second straight line in contact with the circular arc and passing through the end point, and, if the position of the end point is changed, re-calculates the second straight line as a straight line passing through the changed end point without changing a radius of the circular arc and in contact with the circular arc. The driving unit drives the substrate holding unit such that the center of the substrate holding unit moves on the first straight line, and then, moves on the circular arc from a contact point between the first straight line and the circular arc, followed by moving on the second straight line from a contact point between the circular arc and the second straight line to reach the end point, thereby transporting the substrate from the start point to the end point.

In the above-mentioned substrate transporting apparatus, wherein the substrate may be a disc-type semiconductor wafer having a diameter of about 450 mm.

In order to achieve the above-mentioned object, the present disclosure provides a substrate processing apparatus including a disposing unit configured to dispose a substrate; a substrate processing unit configured to perform a predetermined processing on the substrate disposed on the disposing unit; a substrate holding unit configured to hold the substrate; a substrate transporting apparatus configured to transport the substrate held in the substrate holding unit; a control unit configured to determine a substrate transportation path by the substrate transporting apparatus; and a driving unit configured to drive the substrate holding unit along the substrate transportation path determined by the control unit. In order to transport the substrate held in the substrate holding unit from a predetermined start point to the disposing unit the center of which is regarded as an end point, the control unit calculates a trajectory of a first straight line passing through the start point of the substrate transportation path, a trajectory of a circular arc in contact with the first straight line, and a trajectory of a second straight line in contact with the circular arc and passing through the end point, and, if the position of the end point is changed, re-calculates the second straight line as a straight line passing through the changed end point without changing a radius of the circular arc and in contact with the circular arc, and the driving unit drives the substrate holding unit such that the center of the substrate holding unit moves on the first straight line, and then, moves on the circular arc from a contact point between the first straight line and the circular arc, followed by moving on the second straight line from a contact point between the circular arc and the second straight line to reach the end point, thereby transporting the substrate from the start point to the end point.

In the above-mentioned substrate transporting apparatus, the control unit may change the position of the end point so as to match the center of the substrate with the center of the disposing unit in a case where the center of the substrate is deviated from the center of the substrate holding unit.

In the above-mentioned substrate transporting apparatus, the substrate may be a disc-type semiconductor wafer having a diameter of about 450 mm.

In the above-mentioned substrate transporting apparatus, the substrate processing chamber may be a substrate disposing chamber configured to switch between an air atmosphere and a vacuum atmosphere, or a plasma processing chamber configured to perform a plasma processing on the substrate.

In order to achieve the above-mentioned object, the present disclosure provides a computer-readable storage medium storing a program for performing a method for determining a substrate transportation path when moving a substrate holding unit of a substrate transportation robot from a predetermined start point to an end point in order to transport a substrate held in the substrate holding unit. Here, the method includes determining a trajectory of a first straight line passing through the start point; calculating a trajectory of a circular arc in contact with the first straight line; calculating a trajectory of a second straight line in contact with the circular arc and passing through the end point; if the position of the end point is changed, re-calculating the second straight line as a straight line passing through the changed end point without changing a radius of the circular arc and in contact with the circular arc; and allowing the center of the substrate holding unit to move on the first straight line, and then, move on the circular arc from a contact point between the first straight line and the circular arc, followed by moving on the second straight line from a contact point between the circular arc and the second straight line so as to reach the end point.

According to the present disclosure, the substrate transportation path through which the center of the substrate holding unit configured to hold a substrate passes is determined by determining a trajectory of a first straight line passing through a start point; calculating a trajectory of a circular arc in contact with the first straight line; calculating a trajectory of a second straight line in contact with the circular arc and passing through the end point; then, if the position of the end point is changed, re-calculating the second straight line as a straight line passing through the changed end point without changing a radius of the circular arc and in contact with the circular arc.

Accordingly, in a case where the second straight line is changed because the position of the end point is changed, the contact point between the second straight line and the circular arc may be changed, and the substrate transportation path may be changed so as to digress from the circular arc to the second straight line at the contact after changed. Therefore, even in a case where it is necessary to change the trajectory of the substrate holding unit in order to transport the substrate to a target position, the substrate may be transported to the target position (the end point after changed) by simply changing a timing of digressing from the trajectory of the circular arc without re-calculating the trajectory of the circular arc. Accordingly, the calculation load for calculating the transportation path may be reduced. At this time, since the trajectory of the circular arc is not re-calculated, that is, the radius of the circular arc is always constant without being changed, the force applied to the substrate during the substrate transportation also becomes always constant. As a result, the management of the force applied to the substrate during the substrate transportation (for example, a control of the substrate transportation speed) becomes easier.

At that time, since the clearance between the substrate carrying-in/out port and the substrate holding unit is almost not changed, the substrate may be suppressed securely from interfering (colliding or contacting) with the substrate carrying-in/out port. Further, it becomes easier to make a judgment that the interference of the substrate with the substrate carrying-in/out port cannot be avoided. In this case, it is possible to take an action such as stopping the substrate transportation before the interference is caused.

Hereinafter, an exemplary embodiment of the present disclosure will be described with reference to figures. In the exemplary embodiment, a semiconductor wafer (hereinafter, referred to as a "wafer") having a diameter of 450 mm (Φ 450 mm) will be exemplified as a substrate, and a substrate processing system performing a plasma processing on a wafer (plasma processing system) will be exemplified.

FIG. 1 is a schematic plan view illustrating a configuration of a substrate processing system according to the exemplary embodiment of the present disclosure. A substrate processing system 10 is configured to perform a plasma processing on a wafer W one by one. Particularly, the substrate processing system 10 includes a transfer module 11 (substrate transporting chamber) in an approximately pentagonal shape when viewed from the top, six process modules 12 (substrate processing chamber) arranged radially around the transfer module 11 and each connected to the transfer module 11, a loader module 13 arranged to oppose the transfer module 11, and two load lock modules 14 (air/vacuum switching chamber) interposed between the transfer module 11 and the loader module 13.

The process module 12 has a vacuum chamber in which a cylindrical stage 15 is installed as a disposing table configured to dispose a wafer W. In the process module 12, the vacuum chamber is evacuated to a predetermined degree of vacuum after the wafer W is disposed on the stage 15, a processing gas is introduced, a high-frequency power is applied to the vacuum chamber to generate plasma, and a plasma processing such as an etching processing is performed on the wafer W by the generated plasma. The process module 12 and the transfer module 11 are separated by an opening/closing gate valve 16.

The stage 15 provided in the process module 12 is installed with a plurality of thin rod-shaped lift pins (e.g., 3 lift pins) capable of protruding from the upper surface. These lift pins are disposed on the same circumference when viewed from the top, protrudes from the upper surface of the stage 15 to support and lift the wafer W disposed on the stage 15, and retreats to the inside of the stage 15 to dispose the supported wafer W on the stage 15.

The transfer module 11 is maintained under a vacuum atmosphere. In the inside, there is disposed a first transportation device 17 having two transportation arms 17a of two-scalar arm type and a guide rail (not illustrated) disposed therein. Each of the two transportation arms 17a is configured to be rotatable and expandable/retractable. And, a folk (e.g., an end effector) 17b configured to dispose and hold the wafer W is attached to the tip. The first transportation device 17 is movable along the guide rail, and transports the wafer W between the respective process modules 12 and the respective load lock modules 14.

The load lock module 14 is configured as an internal pressure switchable chamber which can switch between a vacuum atmosphere and an air atmosphere. The load lock module 14 and the transfer module 11 are separated by an opening/closing gate valve 19a. The load lock module 14 and the loader module 13 are separated by an opening/closing gate valve 19b. Inside the load lock module 14, a cylindrical stage 18 is disposed as a disposing table configured to dispose the wafer W. Similar to the stage 15 of the process module 12, the stage 18 is installed with lift pins capable of protruding from the upper surface of the stage 18.

When transporting the wafer W from the loader module 13 to the transfer module 11, the load lock module 14 first receives the wafer W from the loader module 13 while maintaining the inside under an air atmosphere, and then, delivers the wafer W to the transfer module 11 while decompressing the inside under vacuum. On the contrary, when transporting the wafer W from the transfer module 11 to the loader module 13, the load lock module 14 first receives the wafer W from the transfer module 11 while maintaining the inside under vacuum, and then, delivers the wafer W to the loader module 13 while increasing the pressure of the inside to an atmospheric pressure.

The loader module 13 is configured as a rectangular parallelepiped-shaped atmospheric transportation chamber to which the load lock module 14 is connected at one side of the longitudinal direction, and a plurality of hoop disposing tables 21 (e.g., 3 tables) configured to dispose hoops (not illustrated), which are containers for accommodating a plurality of wafers W, is connected at the other side of the longitudinal direction.

Inside the loader module 13, there is disposed a second transportation device 20 configured to transport the wafer W. The second transportation device 20 includes a guide rail (not illustrated) and a transportation arm 20a of a scalar arm type. The transportation arm 20a is configured to be movable along the guide rail, and rotatable and expandable/retractable. Similar to the first transportation device 17, a fork 20b configured to dispose and hold the wafer W is attached to the tip of the transportation arm 20a. In the loader module 13, the second transportation device 20 transports the wafer between the hoops disposed in the hoop disposing tables and the respective load lock modules 14.

The substrate processing system 10 has a control device 22 constituted with a computer. The control device 22 is a higher control unit configured to perform an operation control of the entire substrate processing system 10, and is provided with a lower control unit configured to perform a driving control of various operative elements at its lower level. As an example of the lower control unit, FIG. 1 illustrates a first transportation controller 23 configured to control driving of the first transportation device 17, and a second transportation controller 24 configured to control driving the second transportation device 20. However, the lower control unit is not limited thereto.

Further, in the transfer module 11, a position detection sensor (not illustrated in FIG. 1, see FIG. 2A) configured to detect a positional deviation of the wafer W held in the fork 17b is installed in the vicinity of the gate valve 16 installed with respect to the process module 12 and in the vicinity of the gate valve 19a installed with respect to the load lock module 14. When the position detection sensor detects a positional deviation between the center of the wafer W and the center of the fork 17b, as described below with reference to FIGS. 2A to 2D, the first transportation controller 23 changes the transportation path of the fork 17b such that the positional deviation is corrected to dispose the wafer W on the stage 15 or the stage 18.

Next, a method for determining the transportation path of the wafer W will be described with an example of the first transportation device 17. Here, description will be made on a method for determining of the transportation path in a case where the first transportation device 17 carries the wafer W to the load lock module 14. However, an operation that the first transportation device 17 carries the wafer W to the process module 12 or a method for determining of the transportation path in a case where the second transportation device 20 carries the wafer W to the toad lock module 14 may be used.

Figure 2A:
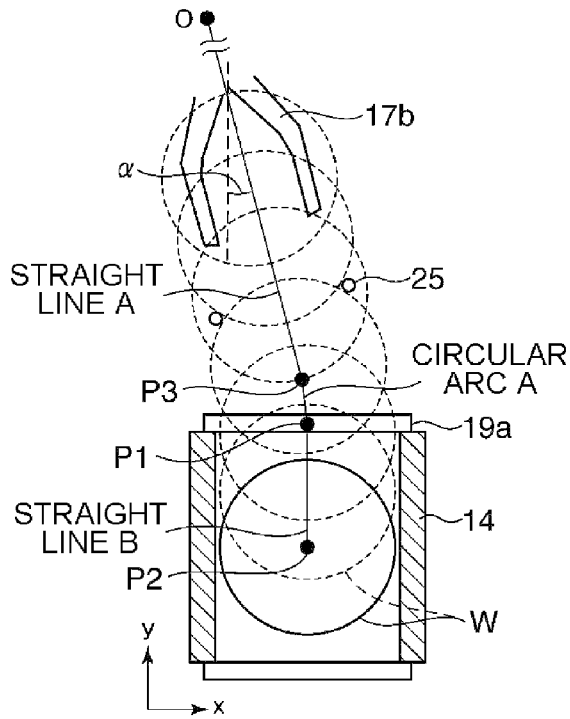
FIGS. 2A to 2D are views schematically illustrating a method for determining a substrate transportation path according to an exemplary embodiment of the present disclosure.

FIG. 2A is a view illustrating a transportation path when the wafer W held in the fork 17b of the first transportation device 17 is transported to the load lock module 14. In FIG.

Figure 2B:
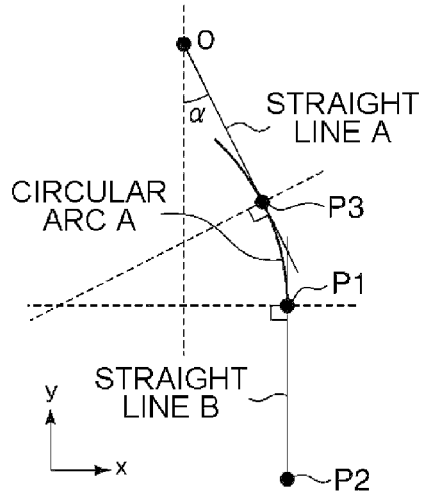

2A, the center of the gate valve 19a is set as a via-point P1, the center of the stage 18 installed in the load lock module 14 is set as an end point P2, and a direction in parallel with a straight line B connecting the via-point P1 and the end point P2 is set as a y-axis direction. In addition, the x-axis orthogonal to the y-axis is defined as illustrated in FIG. 2B. Further, the x-axis and y-axis set in FIGS. 2A and 2B is applied to FIGS. 2C and 2D described below in the same manner.

In FIG. 2A, a start point O is illustrated as a point where the fork 17b holding the wafer W initiate an operation for carrying the wafer W to the load lock module 14. A straight line A intersecting with the y-axis at an angle α represents one of the transportation directions of the wafer W. The angle α and the straight line A may be set based on the positional relationship between the first transportation device 17 and the load lock module 14. On the contrary, the first transportation device 17 and the load lock module 14 are arranged so as to save the space of the substrate processing system 10. This arrangement is based on a premise that the first transportation device 17 cannot allow the fork 17b to be accessed by movement in a simple direction (e.g., straight line B direction) to the load lock module 14.

The center of the fork 17b is allowed to move from the start point O along the straight line A to arrive at a position P3, and then, move along a circular arc A obtained according to a circular interpolation method as described below to arrive at the via-point P1, followed by moving from the via-point P1 to the end point P2 along a straight line B, which is one of transportation directions of the wafer W.

Here, as illustrated in FIG. 2A, when the fork 17b is moving along the straight line A, the center of the wafer W is detected by a position detection sensor 25 installed in the transportation path. Here, it is assumed that the first transportation controller 23 judges that the center of the wafer W is consistent with the center of the fork 17b, based on an output signal from the position detection sensor 25. That is, if the wafer W is held without a positional deviation with respect to the fork 17b, the center of the fork 17b and the center of the wafer W are consistent with each other. Accordingly, by driving the fork 17b so as to pass through the transportation path of the start point O, the straight line A, the position P3, the circular arc A, the via-point P1, the straight line B and the end point P2 in this order, the wafer W may be transported such that the center of the wafer is consistent with the center of the stage 18 installed in the load lock module 14.

FIG. 2B is a view schematically illustrating a method for determining the transportation path as illustrated in FIG. 2A. The transportation path as illustrated in FIG. 2B is performed by the first transportation controller 23 executing a predetermined program for determining a transportation path.

As described for FIG. 2A, the straight line A indicating the first transportation direction, the straight line B indicating the second transportation direction, the start point O, the via-point P1 and the end point P2 are set in advance. Therefore, it is required to calculate a trajectory of the circular arc A, and the trajectory of the circular arc A is calculated so as to satisfy two conditions that (1) the circular arc A is in contact with the straight line A (e.g., the straight line becomes a contact line), and (2) the circular arc A passes through the via-point P1 and the center of the circular arc A is on the x-axis passing through the via-point P1 (e.g., the y-axis coordinate of the via-point P1 and the y-axis coordinate of the center of the circular arc A are the same as each other). By doing this, the position P3, which is a contact point between the straight line A and the circular arc A, is determined. Accordingly, the transportation path starting from the position P3, passing through the circular arc A and arriving at the via-point P1 is determined, and thus, the same transportation path from the start point O to the end point P2 as in FIG. 2A is determined.

Next, it is assumed that the wafer W is held in the fork 17b in a state where a positional deviation is caused. In this case, in order to transport the wafer W such that the center of the wafer W is consistent with the center of the stage 18 installed in the load lock module 14, it is necessary to change the transportation path of the fork 17b. In the present exemplary embodiment, this problem is coped by changing a timing at which the center of the fork 17b digresses from the circular arc A based on a positional deviation amount of the wafer W without re-calculating the trajectory of the circular arc A. Hereinafter, description will be made in detail with reference to FIGS. 2C and 2D.

Figure 2C:
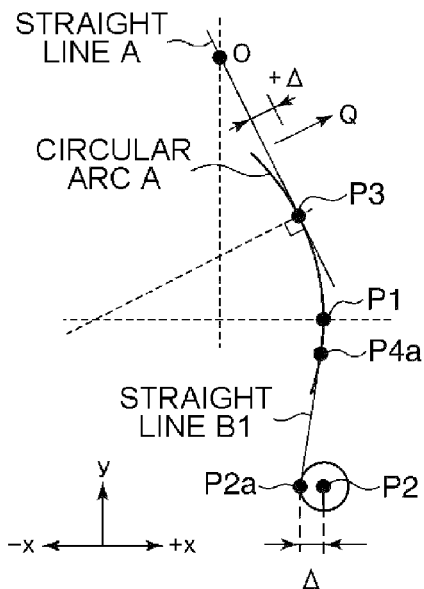
Figure 2D:
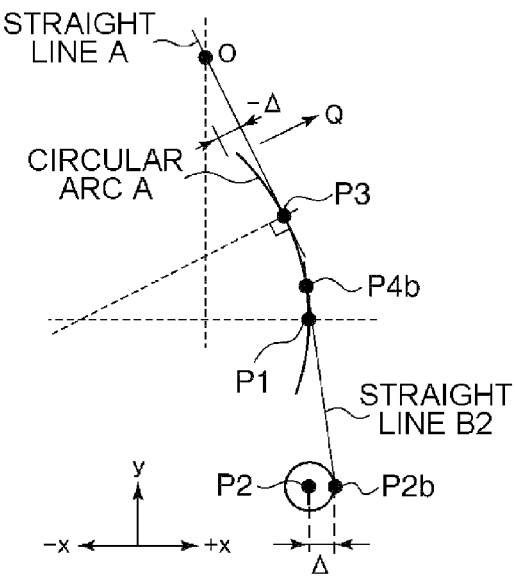

FIGS. 2C and 2D are views schematically illustrating a method for determining the transportation path of the fork 17b in a case where a positional deviation is caused between the center of the wafer W and the center of the fork 17b. FIG. 2C illustrates a transportation path which moves the center of the fork 17b to an end point P2a after the change to a −x side such that the center of the wafer W is consistent with the center of the stage 18 installed in the load lock module 14, because the center of the wafer W has been shifted by +Δ (hereinafter, referred to as a "positional deviation (+Δ)") in a direction of an arrow Q orthogonal to the straight line A with respect to the center of the fork 17b.

When the fork 17b is moving along the straight line A, if the first transportation controller 23 detects a positional deviation amount (+Δ) of the wafer W based on the output signal of the position detection sensor 25, the first transportation controller 23 changes the end point of the fork 17b from the end point P2 to the end point P2a based on the positional deviation amount (+Δ). Then, the first transportation controller 23 calculates a straight line B1 passing through the end point P2a after the change and in contact with the circular arc A to obtain a contact point P4a between the circular arc A and the straight line B1, and determines the transportation path such that the fork 17b moves along the circular arc A and digresses from the circular arc A to the straight line B1 at the position P4a.

According to the transportation path thus determined, by driving the fork 17b so as to pass through the start point O, the straight line A, the position P3, the circular arc A, (the via-point P1), the position P4a, the straight line B1 and the end point P2a in this order, the wafer W may be transported such that the center of the wafer is consistent with the center of the stage 18 installed in the load lock module 14.

Further, in a case where the center of the wafer W is shifted in the direction of the arrow Q orthogonal to the straight line A with respect to the center of the fork 17b, the position P4a is obtained as a point after passing the via-point P1 on the circular arc A, based on the relationship between the position of the end point P2a after the change and the circular arc A. As a result, the center of the fork 17b must pass through the via-point P1.

Here, as described with reference to FIG. 2A, since the via-point P1 is determined as the x-axis direction center of the gate valve 19a, the fact that the center of the fork 17b passes through the via-point P1 indicates that the clearance of the fork 17b with respect to the x-direction width of the wafer carrying-in/out port of the load lock module 14 is constant. Meanwhile, since the diameter of the wafer W is known as well, in a case where the positional deviation amount (+Δ) detected by the position detection sensor 25 exceeds the clearance capable of carrying the wafer W to the inside of the load lock module 14 without interfering with the wafer carrying-in/out of the load lock module 14, it is possible to easily perform a processing which stops carrying-in of the wafer W to the load lock module 14.

FIG. 2D illustrates a transportation path which moves the center of the fork 17b to an end point P2b after the change to a +x side such that the center of the wafer W is consistent with the center of the stage 18 installed in the load lock module 14, because the center of the wafer W has been shifted by −Δ in a direction opposite to the direction of an arrow Q orthogonal to the straight line A with respect to the center of the fork 17b. The method for determining the transportation path in this case is equivalent to the method for determining the transportation path in FIG. 2C.

That is, when the fork 17b is moving along the straight line A, if the first transportation controller 23 detects a positional deviation amount (−Δ) of the wafer W based on the output signal of the position detection sensor 25, the first transportation controller 23 changes the end point of the fork 17b from the end point P2 to the end point P2b based on the positional deviation amount (−Δ). Then, the first transportation controller 23 calculates a straight line B2 passing through the end point P2b after the change and in contact with the circular arc A to obtain a contact point P4b between the circular arc A and the straight line B2, and determines the transportation path such that the fork 17b moves along the circular arc A and digresses from the circular arc A to the straight line B2 at the position P4b. According to the transportation path thus determined, by driving the fork 17b so as to pass through the start point O, the straight line A, the position P3, the circular arc A, the position P4b, the straight line B2 and the end point P2b in this order, the wafer W may be transported such that the center of the wafer is consistent with the center of the stage 18 installed in the load lock module 14.

Further, in a case where the center of the wafer W is shifted in a direction opposite to the direction of the arrow Q orthogonal to the straight line A with respect to the center of the fork 17b, the position P4b is obtained as a point before arriving at the via-point P1 on the circular arc A, based on the relationship between the position of the end point P2b after the change and the circular arc A. Even in this case, it is possible to know which coordinate point on the x-axis passing through the via-point P1 the straight line B2 passes through at a time that the straight line B2 is calculated. Accordingly, it is possible to easily judge whether the wafer W is transported to the inside of the load lock module 14 without interfering with the wafer carrying-in/out port of the load lock module 14, based on the coordinate point, the positional deviation amount (−Δ), the diameter of the wafer W and the x-direction width of the wafer carrying-in/out port of the load lock module 14.

FIGS. 2C and 2D illustrated a method for determining the transportation path in a case where the center of the wafer W is shifted with respect to the center of the fork 17b in a direction orthogonal to the straight line A. In contrast, in a case where the center of the wafer W is shifted with respect to the center of the fork 17b only in the direction of the straight line A, it is sufficient to adjust a transportation length on the straight line B. Accordingly, the positional deviation in an arbitrary direction of the center of the wafer W with respect to the center of the fork 17b is determined by obtaining the straight line B1 (or B2) as described with reference to FIG. 2C (or FIG. 2D). Then, by correcting the length, the wafer W may be transported such that the center of the wafer W is consistent with the center of the stage 18 installed in the load lock module 14.

As described above, in the present exemplary embodiment, when the wafer W is held in the fork 17b in a state where a positional deviation is caused, and the wafer W is transported such that the center of the wafer W is consistent with the center of the stage 18 installed in the load lock module 14, the straight line B1 (or B2) passing through the end point P2a (or P2b) after the revision and in contact with the circular arc A are obtained, such that the center of the fork 17b digresses from the circular arc A at contact points (the position P4a or P4b) between the circular arc A and the straight line B1 (or B2). As a result, the clearance between the fork 17b and the wafer carrying-in/out port of the load lock module 14 may be maintained substantially constantly, thereby suppressing the interference (e.g., a collision) of the wafer W with the wafer carrying-in/out port of the load lock module 14. Further, since it is not necessary to re-calculate the trajectory of the circular arc A depending on the positional deviation (+Δ, −Δ) of the wafer W with respect to the fork 17b, the calculation load of the first transportation controller 23 may be decreased, and the cost for the first transportation controller 23 may be reduced. At the same time, the trajectory of the circular arc A is not re-calculated, and thus, the radius of the circular arc A is always constant without being changed. Accordingly, the force, such as an inertial force or a centrifugal force, applied to the wafer W during the transportation of the wafer W also becomes always constant. As a result, the management of the force applied to the substrate during the transportation of the wafer W (for example, a control of the transportation speed) becomes easier.

Although the exemplary embodiment of the present disclosure is described above, the present disclosure is not limited to the exemplary embodiment. In the above description, the transportation path of the wafer W is changed in a case where a positional deviation of the wafer W with respect to the fork 17b is detected by the position detection sensor 25 during the transportation of the wafer W. However, it is not limited to such an example, and, for example, even in a case where an offset is set to a transport destination of the wafer W in advance, the above-described method for determining a substrate transportation path may be used. In this case, since it is not necessary to re-calculate the trajectory of the circular arc A which has been calculated, the calculation load for calculating the transportation path of the wafer W may be reduced. Further, the wafer W may be transported to a target position correctly by simply changing the timing of digressing from the circular arc A. Further, the trajectory of the circular arc A is not re-calculated, and thus, the radius of the circular arc A is always constant without being changed. Accordingly, the force, such as an inertial force or a centrifugal force, applied to the wafer W during the transportation of the wafer W also becomes always constant. As a result, the management of the force applied to the substrate during the transportation of the wafer W (for example, a control of the transportation speed) becomes easier.

Although the substrate processing system 10 that performs a plasma processing on the wafer W is exemplified in the above description, but, without being limited thereto, the above-described method for determining a substrate transportation path may be used to determine a transportation path of a wafer W in other processing systems (e.g., a cleaning system, a film forming system, etc.) which process a wafer W one by one. In addition, although the first transportation controller 23 is responsible for an operation processing to determine the transportation path of the wafer W in the above exemplary embodiment, the present disclosure may have a configuration in which the control device 22 serving as a higher control unit performs the operation processing to determine the transportation path of the wafer W, and the first transportation controller 23 controls the operation of the first transportation device 17 based on the control information on the transportation path received from the control device 22.

Further, in the above description, the wafer W is exemplified as a substrate, but it is not limited thereto. For example, the above-described method for determining a substrate transportation path may be used for transportation of glass substrates in a processing apparatus which processes a glass substrate for liquid crystal display (LCD).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for determining a substrate transportation path when moving a substrate holding unit of a substrate transport robot from a predetermined start point to an end point in order to transport a substrate held in the substrate holding unit, the method comprising:
    determining a trajectory of a first straight line passing through the start point;
    calculating a trajectory of a circular arc in contact with the first straight line;
    calculating a trajectory of a second straight line in contact with the circular arc and passing through the end point;
    if the position of the end point is changed, re-calculating the second straight line as a straight line passing through the changed end point without changing a radius of the circular arc and in contact with the circular arc; and
    allowing the center of the substrate holding unit to move on the first straight line, and then, move on the circular arc from a contact point between the first straight line and the circular arc, followed by moving on the second straight line from a contact point between the circular arc and the second straight line so as to reach the end point.

2. The method of claim 1, wherein the substrate is a disc-type semiconductor wafer having a diameter of about 450 mm.

3. A substrate transporting apparatus comprising:
    a substrate holding unit configured to hold a substrate;
    a control unit configured to determine a substrate transportation path when moving the substrate holding unit from a predetermined start point to an end point in order to transport a substrate held in the substrate holding unit; and
    a driving unit configured to drive the substrate holding unit along the substrate transportation path determined by the control unit,
    wherein the control unit calculates a trajectory of a first straight line passing through the start point of the substrate transportation path, a trajectory of a circular arc in contact with the first straight line, and a trajectory of a second straight line in contact with the circular arc and passing through the end point, and, if the position of the end point is changed, re-calculates the second straight line as a straight line passing through the changed end point without changing a radius of the circular arc and in contact with the circular arc,
    the driving unit drives the substrate holding unit such that the center of the substrate holding unit moves on the first straight line, and then, moves on the circular arc from a contact point between the first straight line and the circular arc, followed by moving on the second straight line from a contact point between the circular arc and the second straight line to reach the end point, thereby transporting the substrate from the start point to the end point.

4. The substrate transporting apparatus of claim 3, wherein the substrate is a disc-type semiconductor wafer having a diameter of about 450 mm.

5. A substrate processing apparatus, comprising:
    a disposing unit configured to dispose a substrate;
    a substrate processing unit configured to perform a predetermined processing on the substrate disposed on the disposing unit;
    a substrate holding unit configured to hold the substrate;
    a substrate transporting apparatus configured to transport the substrate held in the substrate holding unit;
    a control unit configured to determine a substrate transportation path by the substrate transporting apparatus; and
    a driving unit configured to drive the substrate holding unit along the substrate transportation path determined by the control unit,
    wherein, in order to transport the substrate held in the substrate holding unit from a predetermined start point to the disposing unit the center of which is regarded as an end point, the control unit calculates a trajectory of a first straight line passing through the start point of the substrate transportation path, a trajectory of a circular arc in contact with the first straight line, and a trajectory of a second straight line in contact with the circular arc and passing through the end point, and, if the position of the end point is changed, re-calculates the second straight line as a straight line passing through the changed end point without changing a radius of the circular arc and in contact with the circular arc,
    the driving unit drives the substrate holding unit such that the center of the substrate holding unit moves on the first straight line, and then, moves on the circular arc from a contact point between the first straight line and the circular arc, followed by moving on the second straight line from a contact point between the circular arc and the second straight line to reach the end point, thereby transporting the substrate from the start point to the end point.

6. The substrate transporting apparatus of claim 5, wherein the control unit changes the position of the end point so as to match the center of the substrate with the center of the disposing unit in a case where the center of the substrate is deviated from the center of the substrate holding unit.

7. The substrate transporting apparatus of claim 6, wherein the substrate is a disc-type semiconductor wafer having a diameter of about 450 mm.

8. The substrate transporting apparatus of claim 5, wherein the substrate processing chamber is a substrate disposing chamber configured to switch between an air atmosphere and a vacuum atmosphere, or a plasma processing chamber configured to perform a plasma processing on the substrate.

9. A computer-readable storage medium storing a program for performing a method for determining a substrate transportation path when moving a substrate holding unit of a substrate transport robot from a predetermined start point to an end point in order to transport a substrate held in the substrate holding unit, the method comprising:
    determining a trajectory of a first straight line passing through the start point;
    calculating a trajectory of a circular arc in contact with the first straight line;
    calculating a trajectory of a second straight line in contact with the circular arc and passing through the end point;
    if the position of the end point is changed, re-calculating the second straight line as a straight line passing through the changed end point without changing a radius of the circular arc and in contact with the circular arc; and allowing the center of the substrate holding unit to move on the first straight line, and then, move on the circular arc from a contact point between the first straight line and the circular arc, followed by moving on the second straight line from a contact point between the circular arc and the second straight line so as to reach the end point.

* * * * *